March 10, 1970     R. A. MOORE     3,499,339

ENGAGING AND DISENGAGING MEANS FOR FRICTION DRIVE

Filed March 26, 1968     2 Sheets-Sheet 1

Inventor
Robert A. Moore
By Arthur Nelson
Attorney

March 10, 1970    R. A. MOORE    3,499,339
ENGAGING AND DISENGAGING MEANS FOR FRICTION DRIVE
Filed March 26, 1968    2 Sheets-Sheet 2
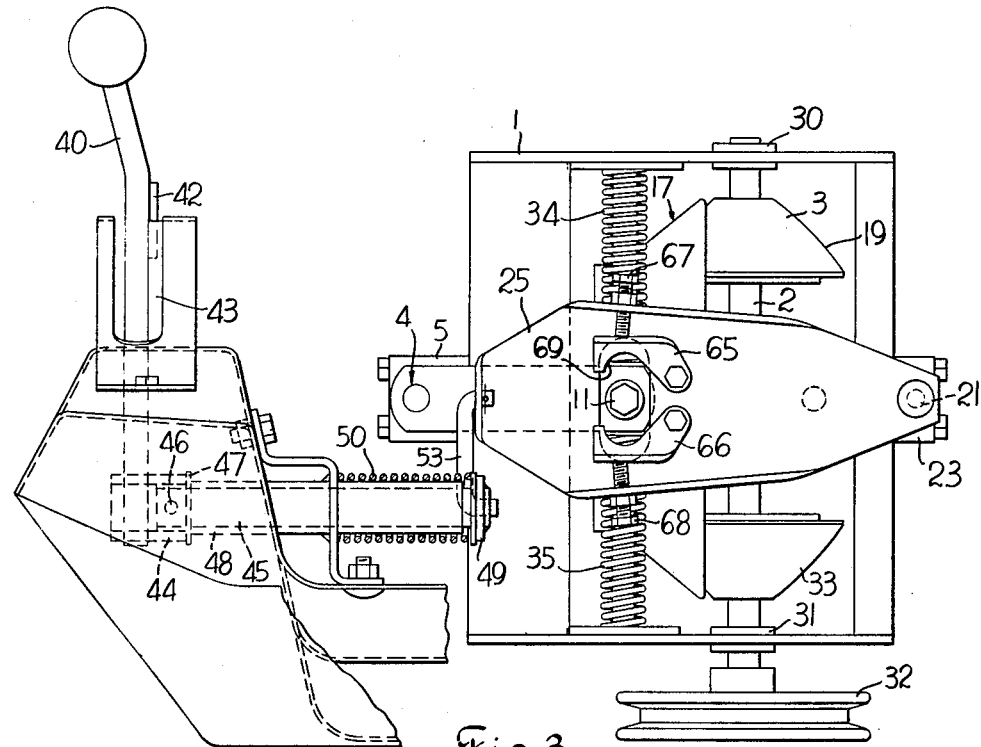
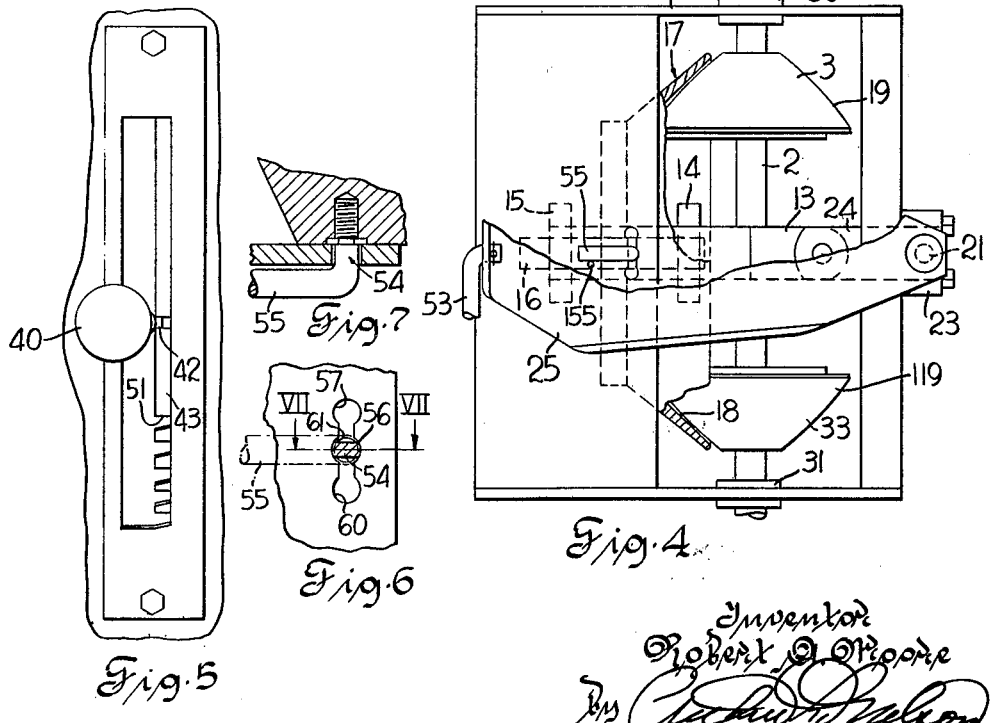

United States Patent Office 3,499,339
Patented Mar. 10, 1970

3,499,339
ENGAGING AND DISENGAGING MEANS
FOR FRICTION DRIVE
Robert A. Moore, Waukesha, Wis., assignor to Allis-Chalmers Manufacturing Company, Milwaukee, Wis.
Filed Mar. 26, 1968, Ser. No. 716,094
Int. Cl. F16h 15/18
U.S. Cl. 74—191          10 Claims

ABSTRACT OF THE DISCLOSURE

A mechanical engaging and disengaging means for a transmission on a tractor having conical engaging internal and external friction facings.

---

This invention relates to a friction engaging and disengaging means and more particularly to a means for engaging and disengaging a driving member and a driven member having a curved facing and a conical facing.

The conventional transmission in a motor vehicle requires a mechanical means to engage and disengage the transmission. A substantial force is required for engaging the clutch facings to provide adequate torque transmission through the clutch. In the conventional clutch, this is accomplished by clutch springs which expand axially against clutch members creating a locking of the two clutch facings together to provide adequate power transmitting torque.

In a cone drive transmission as illustrated in this application wherein external curved surface and internal conical surface of the driving and the driven members are employed, a special type of engaging and disengaging mechanism must be used. Accordingly, this invention sets forth an improved means for engaging and disengaging a cone drive transmission.

This invention includes a manual actuating means operating through a linkage providing a high mechanical advantage to engage and disengage friction facings between the driving and the driven elements. The high mechanical advantage of the actuating means produces a substantial actuating force between the engaging facings. A resilient member is used through which the actuating force is transmitted to engage the driven member with the driving member. The resilient member pivotally connects the actuating linkage to tilt a bearing support for the driven member and place the resilient member under stress which directly transmits the actuating force to the tiltable bearing support which in turn produces an engagement of the driven member with the driving member.

In combination with a positive actuating means to provide adequate force between the facing surfaces, a pivot means is provided to tilt the bearing support in either direction to thereby provide a forward motion or rearward drive motion to the vehicle as the clutch surfaces are engaged.

It is an object of this invention to provide a means for engaging and disengaging a power transmitting cone drive transmission.

It is another object of this invention to provide a means which pivotally engages a cone driven member with a cone driving member and applies the engaging force through a resilient member.

It is a further object of this invention to provide a means for engaging and disengaging a cone drive transmission wherein pivotal movement in a first direction produces a forward drive and pivotal movement in a second direction creates a reverse drive of the vehicle transmission.

It is a further object of this invention to provide a mechanism having manual actuating means providing a high mechanical advantage producing an engaging force which is transmitted through a spring lever to provide positive engagement on high torque output in a cone drive transmission.

The objects of this invention are accomplished by providing a power driven curved conical drive member mounted for rotation on a frame adapted for mounting on a vehicle chassis. A bearing support is pivotally mounted on the frame and rotatably supports a hollow conical driven member for engaging said driving member. An actuating means providing substantial engaging force is pivotally connected to the pivotal bearing support to pivot a driven member in and out of engagement with the driving member through a pivotal spring which frictionally engages the driving and the driven members. A suitable latching means is provided on the actuating linkage to position the actuating means in the neutral disengaging position or an engaging position.

The preferred embodiments of this invention will be described subsequently and are illustrated in the following views.

FIG. 3 illustrates a front elevation view showing the actuating means and the transmission.

FIG. 4 is a modification wherein the transmission can be set in a plurality of speed positions prior to engagement.

FIG. 5 is a plan view of the quadrant and the actuating lever.

FIG. 6 illustrates a fragmentary section showing means for shifting the speed of the transmission.

FIG. 7 is a section view of the shifting means taken along line VII—VII of FIG. 6.

Figure 1:
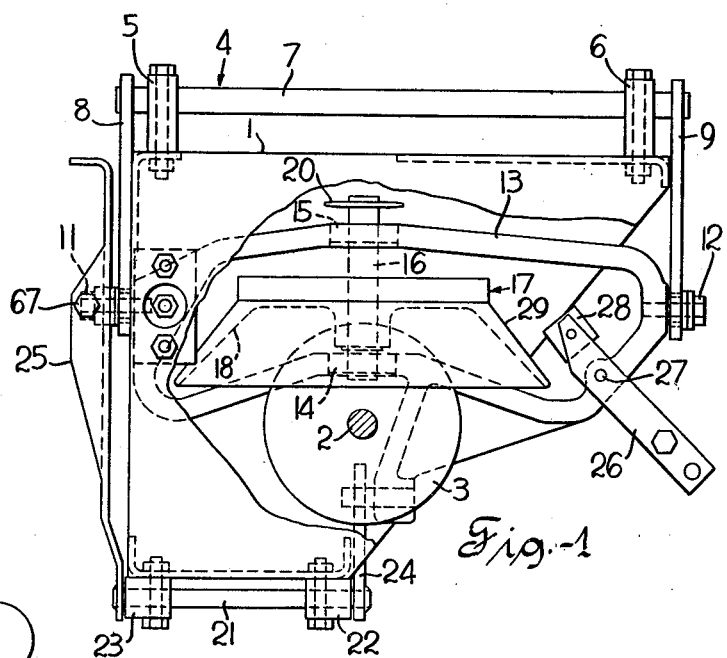
FIG. 1 illustrates a plan view with a section broken away to illustrate the relative position of the components of the transmission.

Referring to FIG. 1, the frame 1 is adapted for mounting on a vehicle chassis and rotatably supports a shaft 2 which is driven by a source of power such as the vehicle engine. The shaft is connected to a driving member 3 which is rotatably supported on the frame and the axis of rotation is fixed relative to the frame 1. A support 4 is journaled on the frame 1 by the journal members 5 and 6 which are fastened to the frame 1. The support 4 consists essentially of a rod 7 and two arms 8 and 9 which extend to form pivots where the bolts 11 and 12 extend through openings in the arms respectively. The bolts 11 and 12 extend into a support 13 which defines bearings 14 and 15 for rotatably supporting the shaft 16 which is keyed to the driven member 17. The driven member 17 defines a hollow cone forming a friction facing 18 positioned adjacent to the friction facing 19 or the conical drive member 3. The shaft 16 is keyed to a sprocket 20 which provides a means for power takeoff for driving the drive shafts of a vehicle.

The tiltable bearing support 13 is pivotally connected to a torsion rod 21 which is pivotally supported on the journal members 22 and 23. The journal members 22 and 23 are fastened to the frame 1. The torsion rod 21 is integral with the arm 24 which is tiltably connected to the tiltable bearing support 13. The actuating arm 25 is also integral with the torsion rod 21.

Brake lever 26 is pivotally supported on the pin 27 mounted on the tiltable bearing support 13. The lever 26 carries a brake shoe 28 which frictionally engages the external surface 29 of the driven member 17.

Figure 2:
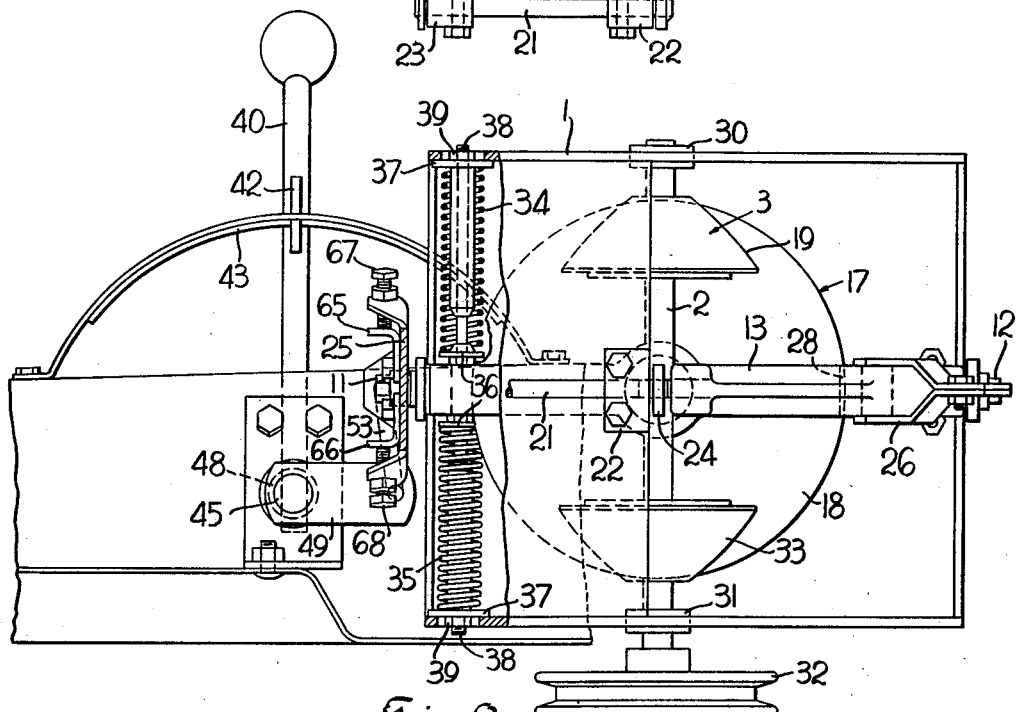
FIG. 2 illustrates a side elevtaion view with a portion of the frame broken away to illustrate components of the transmission.

Referring to FIG. 2, the drive shaft 2 is shown rotatably supported in the bearing assemblies 30 and 31. A drive sheave 32 is connetced to the shaft 2 and drives the conical drive members 3 and 33.

The support 4 is pivotally supported on the journals 5 and 6 which in turn is connected to the bolts 11 and 12 by two arms 8 and 9 which pivotally support the tiltable bearing support 13. The arms 8 and 9 are maintained in a substantially horizontal position as shown in FIG. 2 by the centering springs 34 and 35. Each of the centering springs is compressively mounted between a retainer 36 and a guide 37. The bolt 38 threadedly engages the nut 39 on the end of the bolt which may be tightened or loosened to provide the proper centering of the pivot point of the tiltable bearing support 13. The centering springs 34 and 35 bias the pivot point of the tiltable bearing support 13 to an intermediate position and maintains this position as the drive and driven members 3 and 17 are engaged or disengaged.

A modification will be subsequently described which eliminates the need for the centering springs 34 and 35 and replaces these with a means of adjustably positioning the pivot point of the bearing support 13. The actuating lever 40 pivots in an arc generally illustrated by the movement of the ear 42 on the arm 40. A plan view of the lever 40 carrying the ear 42 for engagement with the ratchet 43 on the quadrant is illustrated in FIG. 5.

Referring to FIG. 3, the lever 40 is shown connected to a sleeve 44 which in turn is connected to the shaft 45 by the pin 46. A washer 47 loose on shaft 45 is connected to the end of the sleeve 44 which embraces the bushing 48 which encircles the shaft 45. The shaft 45 extends axially through the bushing 48 where it in turn is fastened to an end plate 49 which is biased by the spring 50 in a manner to cause the lever 40 to be retained in a position normal to the shaft 45. The biasing force of the spring 50 causes the ear 42 to seat itself within the selected recess 51 in the ratchet 43.

The end plate 49 is fastened to the shaft 45 and formed with an opening to receive the link 53 which in turn is connected to the actuating arm 25. The movement of the lever 40 provides a movement of the linkage which in turn pivots the arm 25 and provides clutch engagement.

Referring to FIG. 4, the drive cones 3 and 33 are shown pivotally supported in the frame 1. The driven member 17 is driven by the preselected drive cone member 3 or 33. The actuation or engagement of the members is the same as that shown and described previously. It is noted, however, that the tiltable bearing support 13 is not supported in a bracket 4 as previously illustrated but is pivotally supported on a pair of rod supports 54 of which one is shown in the front view as illustrated in FIGS. 6 and 7. The rod handle 55 may be lifted to cause the flat portion of the rod to rotate vertically and permit lifting of the rod to the upper bearing hole 57 from which the handle portion 55 is then rotated to a horizontal position to retain this position for supporting the tiltable bearing support 13. Similarly, the handle 55 may be rotated to a vertical position and allowing the bearing portion 56 to drop to a lower bearing opening 60 from which the members may be engaged. This means provides a different gear ratio for the transmission as the members engage. The intermediate openings 61 provide a low gear ratio for the transmission while the extreme openings 57 and 60 provide a high gear ratio for forward and reverse positioning of the transmission respectively when engaged. For the purpose of illustration, it will be assumed that the bearing opening 57 will provide a high gear ratio in the forward direction of the transmission and 60 will provide the high gear ratio for the rearward direction of rotation of the transmission. The direction of the motion will be determined, of course, by the connections between the transmission and the drive shafts which drive the vehicle when the transmission is engaged.

FIG. 4 clearly illustrates that the centering springs 34, 35 are used essentially to maintain the pivot position of the tiltable bearing support which in turn will determine the gear ratio of the transmission. It is understood that the modification as illustrated in FIG. 2 when engaged will provide an infinite speed ratio of the transmission when the speed ratio changing mechanism comes into operation. This portion of the mechanism is shown by the abutments 65 and 66 which are maintained in a predetermined position by an adjusting screw and nut 67 and 68 respectively. When the arcuate portion 69 of abutment 65 engages the bearing support, the driven member 17 is forced to move around the conical surface of the drive member 3 thereby changing the relative radius of the point of contact between the driving member 3 and the driven member 17. This invention is not primarily concerned with the variable speed transmission, however, the means for changing the speed ratio is illustrated with a fixed or a variable positioning of the pivot point to provide any desired speed ratio of the transmission.

The operation of the preferred embodiment of this invention will be described in the following paragraphs.

Referring to FIGS. 1 and 2, the preferred embodiment of this invention is illustrated. Actuating lever 40 is in the neutral position and the transmission is disengaged. The tiltable bearing support 13 is maintained in the intermediate position by the centering springs 34 and 35. FIGS. 3 and 4 illustrate that the driven hollow conical member 17 is not engaging either of the drive members 3 or 33. In this position, the transmission is disengaged and is shifted in the neutral position.

When it is desired to engage the transmission and drive the vehicle, the actuating lever 40 is tilted on the axis of the pin 46 against the biasing force of the spring 50 permitting unlatching of the ear 42 which is retained in a recess of the ratchet 43. The lever 40 is then permitted to rotate about the axis of the shaft 45 which causes the arm 49 to raise the link 53 which in turn pivots the arm 25 about the axis of the torsion rod 21 lifting the arm 24 to tilt the tiltable bearing 13. The tilting of the tiltable bearing mount causes the hollow conical driven member 17 to tilt as well. This in turn will cause the frictional engaging surface 18 of the driven member 17 to engage the conical surface 119 of the conical drive member 33. Upon initial engagement, the torsion rod 21 is placed under stress. A torque is created in the rod 21 by the actuating arm 25 which in turn creates a counter torque from the tiltable bearing support 13. The counter force from the tiltable bearing support 13 is produced by the friction surface 119 of the driving conical member 33. As shown by the actuating linkage, the mechanical advantage of the actuating mechanism is substantial, therefore, the actuating force for engaging the drive and driven members is also substantial. This in turn will provide a substantial torque through the transmission and prevent slippage.

When the vehicle transmission is disengaged, the lever 40 is tilted about the pin 46 and the ear is removed from a recess in the ratchet 43 and returned to a vertical position as shown in FIG. 2. This disengages the drive and driven members and the transmission is placed in neutral.

FIGS. 4, 6 and 7 illustrate a modification of the transmission and wherein the gear ratio or power ratio for the transmission may be adjusted. The control rod 55 is rotated 90° and lifted or depressed. A lifting of the rod 55 and a counter-rotation of 90° when the bearing portion 56 is received in the opening 57 will cause a higher gear ratio in the reverse direction for the vehicle transmission. As previously mentioned, this position is selected for the purpose of illustration only and it is assumed that if the rod 55 were depressed and the bearing portion 56 were received in the opening 60 then a lower gear ratio would be achieved in the reverse direction and a higher gear ratio would be operating for the forward direction of the transmission. The basic difference in the modification illustrated in FIGS. 4, 6 and 7 and the original version in FIGS. 1, 2 and 3 is that the centering springs 34 and 35 are eliminated in the modification. The actuating force does not operate against the centering springs 34 and 35 but is a clutch engaging force.

The actuating force pivots the tiltable bearing a preselected amount on the frame 1. The drive and driven members are then engaged by the engagement force which is transmitted through the torsion rod 21 to maintain a firm but resilient actuating force to provide positive engagement of the vehicle transmission. In either position, the engagement or disengagement is accomplished in substantially the same manner. The essential difference in the two modifications is in changing the gear ratio. FIG. 4 illustrates that the total actuating force is used to produce a reaction force on the drive member 3 which efficiently provides a positive power transmitting force for driving through the transmission and operating the vehicle.

The embodiments of the invention in which an exclusive property or privilege is claimed are defined as follows:

1. A mechanism for engaging a power transmission comprising, a frame adapted for mounting on the vehicle chassis, a driving shaft and a cone driving member defining a fixed axis of rotation on said frame, a tiltable bearing support positioned for pivotal movement relative to said frame, a support means mounted on said frame and pivotally supporting said tiltable bearing support on a substantially stationary pivotal axis, a driven shaft and cone driven member defining a fixed axis of rotation relative to said bearing support and substantially perpendicuar to said driving axis, actuating means adapted for mounting on said vehicle chassis, a resilient member connected to said actuating means and pivotally connected to said tiltable bearing support transmitting an actuating force and tilting said bearing support for pivoting said driven member into continuous frictional engagement with said driving member when said transmission is engaged.

2. A mechanism for engaging a power transmission as set forth in claim 1 wherein said resilient member includes a torsion bar to pivotally bias said tiltable bearing support to frictionally engage said driven member with said driving member to thereby actuate said transmission.

3. A mechanism for engaging a power transmission as set forth in claim 1 wherein said actuating means includes a mechanical linkage having a high mechanical advantage biasing said driven member in frictional engagement with said driving member to thereby produce a substantial power transmitting force through said transmission when said transmission is engaged.

4. A mechanism for engaging a power transmission as set forth in claim 1 wherein said driven member supported on said tiltable bearing support includes means to adjustably position said tiltable bearing support to any preselected position of at least two pivotal positions to thereby vary the relative contact diameters of the point of contact between the driven member and the driving member to vary the speed ratio through the transmission when the transmission is engaged.

5. A mechanism for engaging a power transmission as set forth in claim 1 which includes a lever pivoting on the frame and pivotally connected to said bearing support to transmit the actuating force from the actuating means through the tiltable bearing support to engage the driven member with the driving member when the transmission is actuated.

6. A mechanism for engaging a power transmission as set forth in claim 1 wherein the driving member includes double cone drive portions which provide either forward or reverse power transmission depending on the direction of pivot of said tiltable bearing support when said transmission is engaged.

7. A mechanism for engaging a power transmission as set forth in claim 1 wherein said support means includes a bracket pivotally mounted on said frame and pivotally supporting said tiltable bearing support, a spring biasing said tiltable bearing support to a substantially stationary position when said transmission is engaged.

8. A mechanism for engaging a power transmission as set forth in claim 7 including a pair of preloaded springs biasing said tiltable bearing support to a substantially stationary position.

9. A mechanism for engaging a power transmission as set forth in claim 1 wherein the actuating means for engaging said transmission includes a control lever for positioning on a ratchet means to position the lever in a neutral or transmission engaging position.

10. A mechanism for engaging a power transmission as set forth in claim 1 wherein said driven cone member includes a hollow cone driven surface and said driving cone member includes a double cone portion, the first cone of said double cone portion includes a means for driving the transmission in a forward direction and the second cone provides a means for driving the transmission in a rearward direction when said transmission is engaged.

References Cited

UNITED STATES PATENTS 3,306,132   2/1967   Davis _____ 74—721
3,410,156   11/1968  Davis _____ 74—191 XR JAMES A. WONG, Primary Examiner U.S. Cl. X.R.

74—202